United States Patent [19]

Schaupp

[11] B 3,997,502

[45] Dec. 14, 1976

[54] MORTAR OF INORGANIC BINDER AND FORMALDEHYDE CONDENSATION PRODUCT OF SULFONATED AROMATIC ETHER, IMINE OR SULFONE

[75] Inventor: Kurt Schaupp, Cologne, Germany

[73] Assignee: Bayer Aktiengesellschaft, Leverkusen, Germany

[22] Filed: May 1, 1974

[21] Appl. No.: 465,955

[44] Published under the second Trial Voluntary Protest Program on February 3, 1976 as document No. B 465,955.

[30] Foreign Application Priority Data

May 5, 1973 Germany .................. 2322707

[52] U.S. Cl. ................ 260/37 R; 106/90; 260/49
[51] Int. Cl.$^2$ .................... C08L 61/00
[58] Field of Search ............ 260/37 R, 49; 106/90

[56] References Cited

UNITED STATES PATENTS

| | | | |
|---|---|---|---|
| 2,315,951 | 4/1943 | Fox et al. | 260/49 |
| 3,240,736 | 3/1966 | Beckwith | 260/38 |
| 3,720,529 | 3/1973 | Jordon | 106/90 |
| 3,788,868 | 1/1974 | Kitsuda et al. | 106/90 |

*Primary Examiner*—Donald E. Czaja
*Assistant Examiner*—S. M. Person
*Attorney, Agent, or Firm*—Burgess, Dinklage & Sprung

[57] ABSTRACT

A mortar comprising an inorganic binder such as anhydrite, gypsum or cement is rendered more flowable and processible by incorporating therein a condensation product of formaldehyde with a sulfonated aromatic ether, imine or sulfone, e.g. preferably about 0.3 to 2% by weight of the binder of the condensation product of formaldehyde with sulfonated ditolyl ether. There may also be present an auxiliary such as $FeSO_4 \cdot 7 H_2O$, $Al_2(SO_4)_3 \cdot 18 H_2O$ or $KAl(SO_4)_2$, as well as an additive such as a plasticizer, hardening accelerator, retarder, air-entraining agent, thickener, activator or anti-foam agent, and/or an aggregate such as sand, gravel, perlite, pumice or foamed plastic beads.

7 Claims, No Drawings

MORTAR OF INORGANIC BINDER AND FORMALDEHYDE CONDENSATION PRODUCT OF SULFONATED AROMATIC ETHER, IMINE OR SULFONE

Structural components such as floor toppings, wallboards, walls, ceilings and the like, are generally produced by mixing inorganic binders such as anhydrite (natural or synthetic), gypsum or cement, in some cases undiluted but generally in combination with aggregates such as sand, gravel, perlite, pumice or foamed plastic beads with water, optionally in the presence of additives such as air-entraining agents or plasticizers, and processing the resulting mixture. In order to provide the components prepared with this mortar with favorable properties, it is essential to apply a low water-binder factor (WBF), i.e., to use as little water as possible, based on the binder used. However, the mortar is frequently made viscous in this way. If the water content is further reduced, the mortar loses its plasticity and, hence, its favorable compactability as well. In order, then, to produce high-quality components from a mortar such as this, the mortar has to be subjected to intensive, mechanical compaction by vibration and/or pressing. Since even this is not sufficient for numerous purposes, it is often necessary to use increased quantities of binder in order to obtain the required properties such as high strength, quick setting or early strippability, imperviousness, etc.

All the measures referred to above involve considerable outlay and, hence, heavy costs. For this reason, they are often not applied. Instead, the mortar is made easier to process by increasing the water-binder factor. This often results in qualitative defects in or damage to the components thus produced.

Accordingly, attempts have been made to improve the processibility of mortars by means of chemical additives. Thus, it is known to use so-called plasticizers for concrete, almost all of which are surface-active substances such as, for example, alkylaryl sulfonates, ethylene oxide addition products, alkylphenol polyglycol ethers, lignin sulfonates and others, and also combinations thereof. These products are generally used in quantities of from 0.01 to 0.1%, based on the binder. The saving of water or increase in flowability with optimum dosage amounts to hardly more than from 10 to 12%. Larger additions do not produce any appreciable increase in the plasticizing effect; instead they almost always have an extremely adverse effect upon the properties of the mortar, reflected above all in a decrease in the setting rate, an increase in air-void content and a reduction in strength.

Austrian Patent Specification No. 263,607 proposes the addition of a modified amino-s-triazine resin to inorganic binders. This addition is said to provide the structural material with favorable bond strength, tensile strength and compressive strength and a high surface quality.

It is accordingly an object of the present invention to modify a mortar so as to render it more processible in the course of producing structural components of superior strength and other properties.

These and other objects and advantages are realized in accordance with the present invention pursuant to which there is provided a mortar comprising an inorganic binder and a condensation product of formaldehyde with at least one sulfonated aromatic ether, imine or sulfone. In accordance with the invention the mortar may further comprise at least one additive selected from the group consisting of a plasticizer, hardening accelerator, retarder, air-entraining agent, thickener, activator or anti-foam agent and/or at least one aggregate selected from the group consisting of sand, gravel, perlite, pumice or foamed plastic beads.

The condensation products used in accordance with the invention can be obtained, for example, by condensing formaldehyde with a compound of the formula

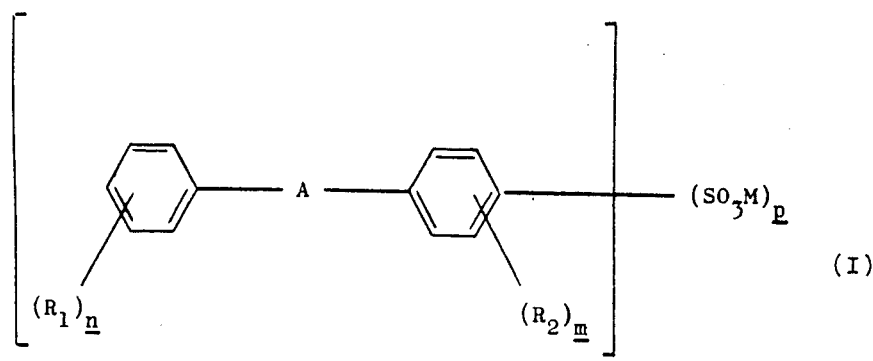

wherein $R_1$ and $R_2$ each independently is hydrogen, an alkyl radical with 1 to 6 carbon atoms (such as, for example, methyl, ethyl, isopropyl or hexyl), or —NR'R'';

R' and R'' each independently is hydrogen or an alkyl radical with 1 to 6 carbon atoms such as, for example, methyl, ethyl, propyl or hexyl;

A is —O—, —NR'— or —SO$_2$—;

M is hydrogen, an alkali metal or an equivalent of an alkaline earth or earth metal atom such as, for example, Na, K, $Mg_{1/2}$, $Ca_{1/2}$, $Al_{1/3}$, alkali metal atoms, especially K, being preferred;

m and n each independently is an integer from 1 to 5;

p is an integer from 0 to 4, preferably from 0 to 2 and, with particular preference, 0 to 1;

the compound having at least one hydrogen atom capable of condensation with formaldehyde which can either be attached to a carbon atom of an aromatic ring or, where an NR'R''— substituent is present in the molecule, to nitrogen.

Preferably there are no more than two NR'R''—substituents in each molecule of formula (I).

In cases where unsulfonated aromatic ethers or imines or sulfones are condensed with formaldehyde, the condensation products obtained can be subsequently sulfonated, for example with sulfuric acid, oleum or chlorsulfonic acid. A molecular unit corresponding to the general formula (I) should preferably have one $SO_3M$-group (M as defined above) in the end product of condensation.

The positions of the ligands $R_1$, $R_2$ and $SO_3M$ in regard to the group A linking the aromatic nuclei are by no means confined to a certain configuration. For example, an $SO_3M$— group can be in the ortho- or para-position to the A-group. The same applies as regards the substituents $R_2 = NR'R''$. However, $SO_3M$ and $NR'R''$ groups are preferably situated in the meta-position, and alkyl substituents in the ortho- or para-position to the group A. One aromatic nucleus preferably contains no more than two $SO_3M$-groups and, with particular preference, only one $SO_3M$-group.

Compounds corresponding to formula (I) are known from the literature. The following compounds are mentioned by way of example: diphenylamine, diphenylsulfone, diphenylamine-4-sulfonic acid, 4'-methyldiphenylamine-4-sulfonic acid (Chem. Ber., 55, 3079, 3092), and ditolyl ether. The condensation of compounds such as these with formaldehyde is described in the literature (for example U.S. Pat. No. 2,315,951, German Patent No. 58,072, German Patent No. 67,013), or can be carried out as described hereinbelow in Example 1b in the case of ditolyl ether.

One exemplary formula for the condensation products according to the invention, which has been simplified in regard to the substituent position of $R_1$ and $SO_3M$, is

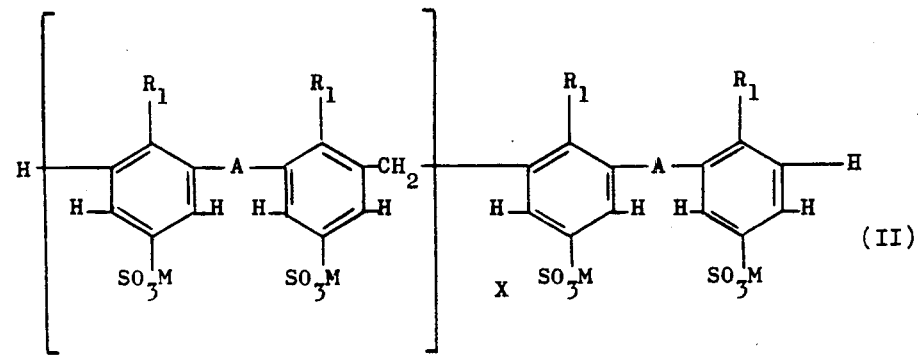

(II)

In formula II, the degree of condensation X is from 1 to about 50, preferably about 4 to 15; the condensation products have average molecular weights of from about 400 to 30,000, preferably from about 1000 to 10,000. $R_1$ has the same meaning as in formula (I). The products used can also be mixtures with a different degree of condensation X.

According to the invention, it is preferred to add to the mortar condensation products of a sulfonated ditolyl ether with formaldehyde. One example of these condensation products is represented by formula (III) below, which has been simplified in regard to the substituent position of $CH_3$ and $SO_3M$:

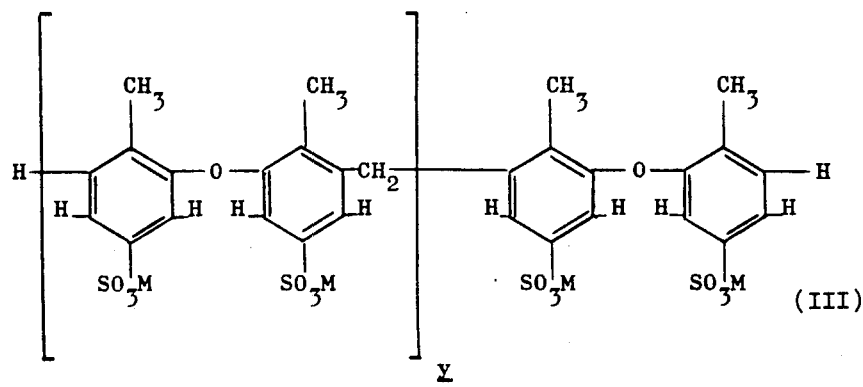

(III)

In formula (III), $y$ is from 1 to about 40, preferably about 4 to 10; the compounds have average molecular weights of about 800 to 20,000, preferably about 1500 to 5000. In these compounds, too, other alkyl and sulfonic acid groups may optionally be present on one nucleus.

The condensation products used in accordance with the invention are employed in quantities of about 0.05 to 10 % by weight and preferably in quantities of about 0.3 to 2 % by weight, based on the binder present. They apply such marked plasticizing effects to the mortar that even the mortar produced with a relatively low water-binder factor is either spontaneously free-flowing or only requires a limited mechanical effort to be brought into the form of compact components. Where the condensation products are added to the mortar according to the invention the water-binder factor can be considerably reduced, so that for the same degree of compaction, for example, components with extremely favorable properties such as high strength, low porosity and hence high impermeability, are obtained. On the other hand, it is possible to obtain for the same water-binder factor or with only a slight reduction in the quantity of mixing water, such a heavily plasticized mortar that there is no longer any need for compaction and which, when it is applied, levels out smoothly and evenly largely on its own. Since the mortar produced in accordance with the invention generally contains only a relatively small quantity of water, it also does not have any tendency towards so-called bleeding, i.e. the binder, aggregate and water remain a homogeneous mass, even in the event of prolonged standing, and in the event of vibration compacting none of the mixing water separates out at the surface. The condensation products according to the invention are preferably used in the preparation of free-flow mortars and free-flow toppings, above all those based on anhydrite as binder, in which case the extremely favorable plasticizing effect is particularly evident.

In some fields of application, a further improvement can be obtained by combining the compounds used according to the invention with special auxiliaries and/or additives. In the context of the invention, auxiliaries are substances which react with basically acting binders, i.e., in the case of synthetic anhydrite with the lime that is always present, to form substantially insoluble hydroxides which in turn are able to form with other basic components hydraulically setting compounds which are incorporated into the hardening mortar. It is possible in this way to obtain particularly strong mortar structures which, in the case of toppings for example, not only increase compressive strength, but also considerably improve the abrasion resistance of the surface. Auxiliaries of this kind are, for example, $FeSO_4 \cdot 7 H_2O$, $Al_2(SO_4)_3$ and $KAl(SO_4)_2$; they can be added to the binder in quantities of about 0.1 % by weight to 5 % by weight, preferably in quantities of about 0.2 % by weight to 2 % by weight.

For special applications, the compounds according to the invention can also be combined with other additives, for example with conventional plasticizers (for example condensation products of nonylphenol with ethylene oxide), hardening accelerators (for example $CaCl_2$ for cement or $K_2SO_4$ for anhydrite), sealing agents (for example alkaline earth salts of stearic acid), air-entraining agents (for example calcium lignin sulfonate) or retarders (for example salts of tartaric acid or citric acid).

The invention will be further described in the following illustrative examples wherein all parts are by weight unless otherwise specifically expressed.

EXAMPLE 1 a. 1 kg of anhydrite is made into a paste with 10 g of potassium sulfate (= 1% by weight, based on anhydrite), 3.9 kg of sand (grain size 0 – 7 mm) and 450 g of water in a planetary mixer for 1 minute at 120 r.p.m. and then for a further minute at 240 r.p.m. An earth-moist mortar is formed. If this mortar is introduced into a slump cone 8 cm tall, 10 cm in diameter at its lower end and 8 cm in diameter at its upper end, placed on a jolting table, and the slump cone is then pulled off upwards after the inlet opening has been skimmed, a frustum with a diameter of 10.1 cm at its lower end is formed. If the frustum thus formed is jolted 15 times, the frustum flattens out or slumps somewhat to a diameter of 12.5 cm.

b. i. In a second test, 233 parts of chlorsulfonic acid are slowly added with stirring to 198 parts of 2,2'-ditolyl ether dissolved in 240 parts of dichlorethylene. The temperature is kept below 25°C, the mixture being stirred for another few minutes on completion of the addition. The dichlorethylene is then distilled off in a current steam. An aqueous solution of the 2,2'dimethyl-5,5'-disulfo-diphenyl ether thus obtained is then heated to 100°– 105°C and 60 parts of a 37 % aqueous formaldehyde solution are added below the surface of the liquid over a period of 80 minutes. The addition is accompanied by continuous stirring, small quantities of water being added as required to reduce the viscosity of the solution. After all the formaldehyde has been added, the solution is stirred for about another 15 hours at 100° to 105°C. The resulting condensation product is obtained in solid form by spray drying. Alternatively it could be processed in aqueous solution in the required concentration, optionally following the addition of water. The condensation product contains an average of about 8 ether groups.

ii. By the process of Example 1a a paste is made up of 1 kg of anhydrite, 10 g of potassium sulfate, 3.9 kg of sand, 450 g of water and 8 g of the product of (i); an equivalent amount of a salt, e.g. the potassium salt, can be substituted for the acid product of (i). Following mixing in the same way, there is obtained a thinly liquid mortar which, after it has been introduced into the slump cone, levels out at the surface almost completely on its own and, following removal of the slump cone, forms a wide mortar cake with a slump factor of 21 cm. A slump factor of 32 cm is measured after subsequent jolting 15 times.

The binder suspension was thinly liquid to some extent so that there was some separation of coarse grain and binder paste. In a preferred embodiment, a compound swellable with water, for example methyl cellulose of average viscosity (for example 5,000 Cp for a 2 % aqueous solution), is added in quantities of about 0.01 to 0.4 % by weight, preferably in quantities of about 0.05 to 0.2 % by weight. It is no longer possible to detect any signs of settling.

c. 10 g of $FeSO_4 \cdot 7H_2O$ (= 1 %, based on anhydrite) were added to the mixture of Example 1b (ii) prior to introduction into the slump cone. The slump factor was 22 cm before jolting and 33 cm after jolting. The mortar did not show any signs of settling, but even so was highly fluent. Hardening and setting behavior substantially corresponded to that of sample 1a.

d) In another test, only 340 g of water to 1 kg of anhydrite, 3.9 kg of sand (0 to 7 mm), 10 g of potassium sulfate and 8 g of the condensation product produced in b. (i) were required to obtain a slump factor of 10.3/12.7 cm which substantially corresponded to that in Example 1a, although in case 1a 450 g of water (= 34 % more) had to be used to obtain this effect. The strengths of the masses of Examples 1a to 1d after 3, 7 and 28 days are set out in Table 1:

Table 1

| Sample | Setting time (minutes) | Strengths ($kp/cm^2$) Bending-tension/compressive | | |
|---|---|---|---|---|
| | | 3 days | 7 days | 28 days |
| 1a) | 240 | 19.3/142 | 44.6/254 | 51.9/268 |
| 1b) | 310 | 20.4/139 | 48.9/285 | 56.7/291 |
| 1c) | 250 | 25.9/187 | 54.3/310 | 64.0/348 |
| 1d) | 180 | 34.1/218 | 65.0/344 | 78.7/412 |

EXAMPLE 2 a. 3 kg of cement (PZ 350) are mixed with 1 kg of $H_2O$ (WBF = 0.33) in a planetary mixer in the same way as described in Example 1a. This results in the formation of a plastic mass with a slump factor of 16.8 cm before jolting and 23.5 cm after jolting.

b. By adding 25 g of the product according to Example 1b (i), a slump factor of 38.7 cm before jolting 44.6 cm after jolting is obtained with the same mixing procedure.

c. Only 720 g of water are required to adjust the material of Example 2b to the slump factor of Example 2a, in other words the saving of water amounts to 28%.

The strengths obtained with the mortars of Examples 2a to 2c after 3, 7 and 28 days are set out in Table 2.

Table 2

| Sample | Setting time (minutes) | Strengths (kp/cm²) Bending-tension/compressive | | |
|---|---|---|---|---|
| | | 3 days | 7 days | 28 days |
| 2a) | 460 | 31.4/168 | 41.1/285 | 63.9/424 |
| 2b) | 480 | 34.2/196 | 52.8/371 | 68.6/509 |
| 2c) | 320 | 56.9/291 | 71.7/508 | 82.0/683 |

It will be appreciated that the instant specification and examples are set forth by way of illustration and not limitation, and that various modifications and changes may be made without departing from the spirit and scope of the present invention.

What is claimed is:

1. A mortar comprising an inorganic binder and about 0.05 to 10% of its weight of a condensation product of formaldehyde with a compound of the formula

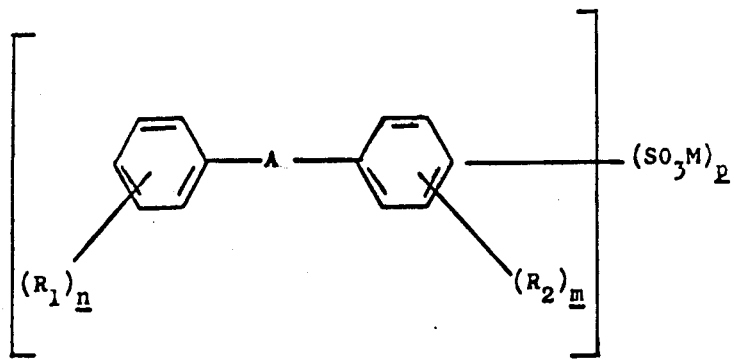

wherein
$R_1$ and $R_2$ each independently is hydrogen, an alkyl radical with 1 to 6 carbon atoms or —NR'R";
R' and R" each independently is hydrogen or an alkyl radical with 1 to 6 carbon atoms;
A is —O—, —NR'— or —SO$_2$—;
M is hydrogen, an alkali metal or an equivalent of an alkaline earth or earth metal;
$m$ and $n$ each independently is an integer from 1 to 5; and
$p$ is an integer from 0 to 4;
the compound having at least one hydrogen atom capable of condensation with formaldehyde which can either be attached to a carbon atom of an aromatic ring or, where an NR'R"— substituent is present in the molecule, to nitrogen.

2. A mortar as claimed in claim 1, wherein said condensation product has an average molecular weight of about 400 to 30,000.

3. A mortar as claimed in claim 1, wherein said condensation product comprises a condensation product of a sulfonated aromatic ether with formaldehyde having an average molecular weight of about 800 to 20,000.

4. A mortar as claimed in claim 3, wherein said sulfonated aromatic ether is sulfonated ditolyl ether and said condensation product has an average molecular weight of about 1500 to 5000.

5. A mortar as claimed in claim 1, further comprising at least one auxiliary selected from the group consisting of FeSO$_4$· 7 H$_2$O, Al$_2$(SO$_4$)$_3$ · 18 H$_2$O and KAl(SO$_4$)$_2$, present in about 0.2 to 5% by weight of the inorganic binder.

6. A mortar as claimed in claim 1, further comprising at least one additive selected from the group consisting of a plasticizer, hardening accelerator, retarder, air-entraining agent, thickener, activator or anti-foam agent, or at least one aggregate selected from the group consisting of sand, gravel, perlite, pumice or foamed plastic beads.

7. A mortar as claimed in claim 4, wherein the condensation product is present in about 0.3 to 2% by weight of the inorganic binder, said inorganic binder comprises at least one member selected from the group consisting of anhydrite, gypsum and cement, said mortar further comprising at least one auxiliary selected from the group consisting of FeSO$_4$ · 7 H$_2$O, Al$_2$(SO$_4$)$_3$ · 18 H$_2$O and KAl(SO$_4$)$_2$, present in about 0.5 to 1.5 % by weight of the inorganic binder, and further comprising at least one additive selected from the group consisting of a plasticizer, hardening accelerator, retarder, air-entraining agent, thickener, activator or anti-foam agent, or at least one aggregate selected from the group consisting of sand, gravel, perlite, pumice or foamed plastic beads.

* * * * *